(12) United States Patent
Polson et al.

(10) Patent No.: US 9,264,890 B2
(45) Date of Patent: Feb. 16, 2016

(54) MOBILE DEVICE CONFIGURATION SYSTEM AND METHOD

(71) Applicant: HTC Corporation, Taoyuan County (TW)

(72) Inventors: Peter Polson, Seattle, WA (US); Timothy A. Johns, Lynnwood, WA (US); John Daly, Seattle, WA (US); Thomas B. Holman, Kent, WA (US); Brasten Sager, Kirkland, WA (US); Brett C. Tanis-Likkel, Seattle, WA (US)

(73) Assignee: HTC CORPORATION, Taoyuan (TW)

( * ) Notice: Subject to any disclaimer, the term of this patent is extended or adjusted under 35 U.S.C. 154(b) by 236 days.

(21) Appl. No.: 14/019,245

(22) Filed: Sep. 5, 2013

(65) Prior Publication Data

US 2015/0065117 A1 Mar. 5, 2015

(51) Int. Cl.
*H04W 4/00* (2009.01)
*H04W 8/24* (2009.01)
*H04L 29/08* (2006.01)
*H04W 4/18* (2009.01)

(52) U.S. Cl.
CPC ............... *H04W 8/245* (2013.01); *H04L 67/34* (2013.01); *H04W 4/001* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 2002/0037714 A1* | 3/2002 | Takae et al. | 455/419 |
| 2005/0111467 A1 | 5/2005 | Ng et al. | |
| 2005/0164737 A1* | 7/2005 | Brown | 455/558 |
| 2007/0143486 A1 | 6/2007 | Kang et al. | |
| 2011/0306318 A1* | 12/2011 | Rodgers et al. | 455/410 |
| 2012/0047084 A1 | 2/2012 | Naghshineh et al. | |
| 2013/0073473 A1 | 3/2013 | Heath | |

* cited by examiner

*Primary Examiner* — Daniel Lai
(74) *Attorney, Agent, or Firm* — McClure, Qualey & Rodack, LLP (57) ABSTRACT

An asset bundle package is created with asset bundle package records for at least two user types and from one or more mobile phone service operators. The asset bundle package and asset bundle record selection criteria are installed on a mobile computing device. A boot routine uses the asset bundle record selection criteria to select asset bundle records required to configure the mobile computing device for at least one of the two user types.

9 Claims, 11 Drawing Sheets

MOBILE DEVICE CONFIGURATION SYSTEM AND METHOD

FIELD

This disclosure relates to a method and system to configure mobile computing devices.

BACKGROUND

The following description includes information that may be useful in understanding the present invention. It is not an admission that any of the information provided herein is prior art or relevant to the presently claimed invention, or that any publication specifically or implicitly referenced is prior art.

Existing systems used by mobile phone service operators to configure mobile computing devices, such as OMA Device Management ("OMA-DM"), require that the mobile phone service operator configure complex server/node systems to set up multiple SKUs and instruct the OEM to configure the mobile phone to contact the mobile phone service operator's OMA-DM server to obtain files and settings needed to configure the phone. This creates an absolute imperative for the mobile phone to have mobile phone service when it is configured (which may occur at the time of the first boot up or it may occur anytime the mobile phone is returned to a "factory default" or similar condition).

Other, even earlier and more manual processes, require that the mobile phone service operator order separate SKUs from the OEM for each user type (regardless of whether the mobile phone service operator may have multiple user types who will be utilizing the same mobile phone hardware), and provide the OEM with detailed configuration settings and files to configure the mobile phone for each separate SKU, regardless of whether the mobile phone service operator may have multiple user types who will be utilizing the same mobile phone hardware and regardless of whether the OEM may be delivering the same mobile phone hardware to multiple mobile phone service operators for use by multiple user types.

With respect to the OMA-DM approach, mobile phone service is not universally available and, even when it is, the network connection attempt is particularly problematic when the mobile phone has not yet been configured. In fact, certain configuration approaches require that the mobile phone be pre-configured with a "temporary" phone number, precisely to address this problem, though problems can occur in disassociating the mobile phone from the temporary number and then associating it with the intended "permanent" phone number for the user. The older, more manual approach, reduces reliance on the network connection, but creates a significant potential for logistical and information-management costs and errors and does not take advantage of the fact that multiple user types (and multiple mobile phone service operators) may be utilizing the same mobile phone hardware.

DETAILED DESCRIPTION

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

As used herein, "Content" comprises text, graphics, images (including still and video images), audio, graphical arrangement, and instructions for graphical arrangement which may, for example, be interpreted by browser applications or similar mobile computing device applications.

As used herein, an "Asset Bundle" is a set of records and settings used to configure a Mobile Device 400; examples of such records and settings are illustrated herein as, for example, a Default Language 350, a Branded Splash Screen 355, Operator Applications 360, one or more SSIDs 365, and Theme Content and Settings 370.

As used herein, a "Mobile Phone Service Operator" is a provider of wireless cellular phone services, also referred to as mobile phone services, generally through Network 150 and generally utilizing cellular technologies such as, for example, GSM, TDMA, CDMA, EDGE, HSPA, LTE or other cellular phone voice and data transmission network technologies. The Mobile Phone Service Operator may also connect with mobile phone service Users via a Wi-Fi connection and may have or may have access to Ethernet and/or Internet network technologies. The Network 150 is discussed further, below. The Mobile Phone Service Operator may be a reseller of mobile phone services provided by another Mobile Phone Service Operator. The Mobile Phone Service Operator provides mobile phone services to Mobile Devices 400, which Mobile Devices 400 are configured according to requirements of the Mobile Phone Service Operator, such as with a Default Language for the region in which Mobile Device 400 is used Generally, a Localize Server 200 executes the Operator Configuration Routine 600 to obtain a first set of Asset Bundle records from a first Operator Configuration Computer 110, which first set of Asset Bundle records may be used to configure a particular type of Mobile Device 400 (associated with a particular Equipment ID 310) for use by a user with a particular user type, such as User Type 330. The Operator Configuration Routine 600 obtains a second set of Asset Bundle records from the first or a second Operator Configuration Computer 110, which second set of Asset Bundle records are used to configure different User Types 330 on the same type of Mobile Device 400. The Operator Configuration Routine 600 creates a menu of Mobile Phone Service Operators and User Types 330 in the event that manual selection is required, assigns an Asset Bundle ID 345 to the entire Asset Bundle comprising both sets of Asset Bundle records, forms an Asset Bundle Package 346, encrypts the Asset Bundle Package 346 using encryption Key 390, transmits the encrypted Asset Bundle Package 346 to an OEM, such as OEM 120, inserts the decryption Key 390 into a Localize Boot Routine 900, and transmits the Localize Boot Routine 900 to the OEM 120. The Operator Configuration Routine 600 also transmits Asset Bundle Record Selection Criteria to the OEM 120.

The Localize Boot Routine 900, Asset Bundle Package 346, and Asset Bundle Record Selection Criteria are loaded on the Mobile Device 400 by the OEM 120.

Figure 7:
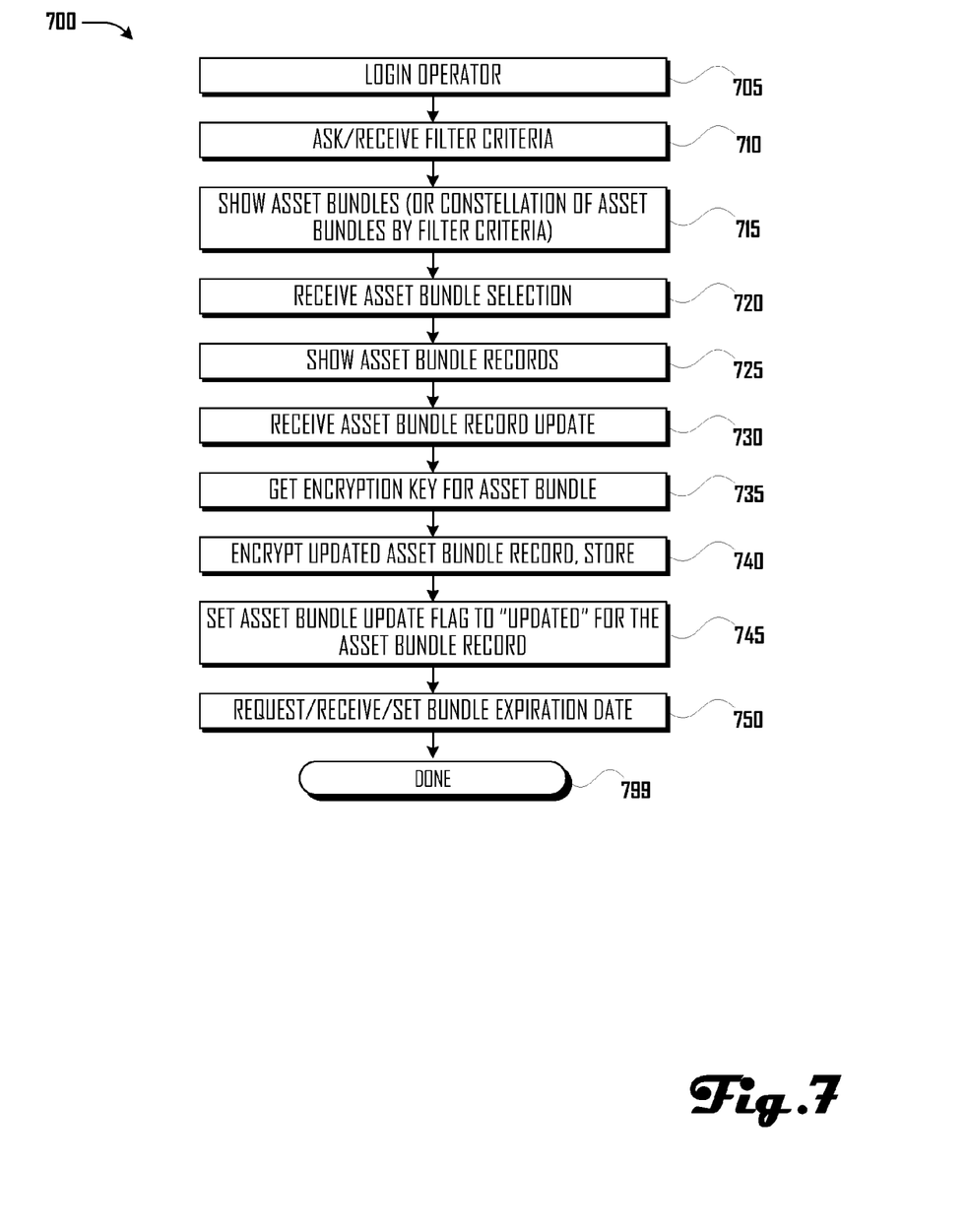
FIG. 7 is a flowchart illustrating an embodiment of an Operator Asset Bundle Update Routine 700.
Figure 8:
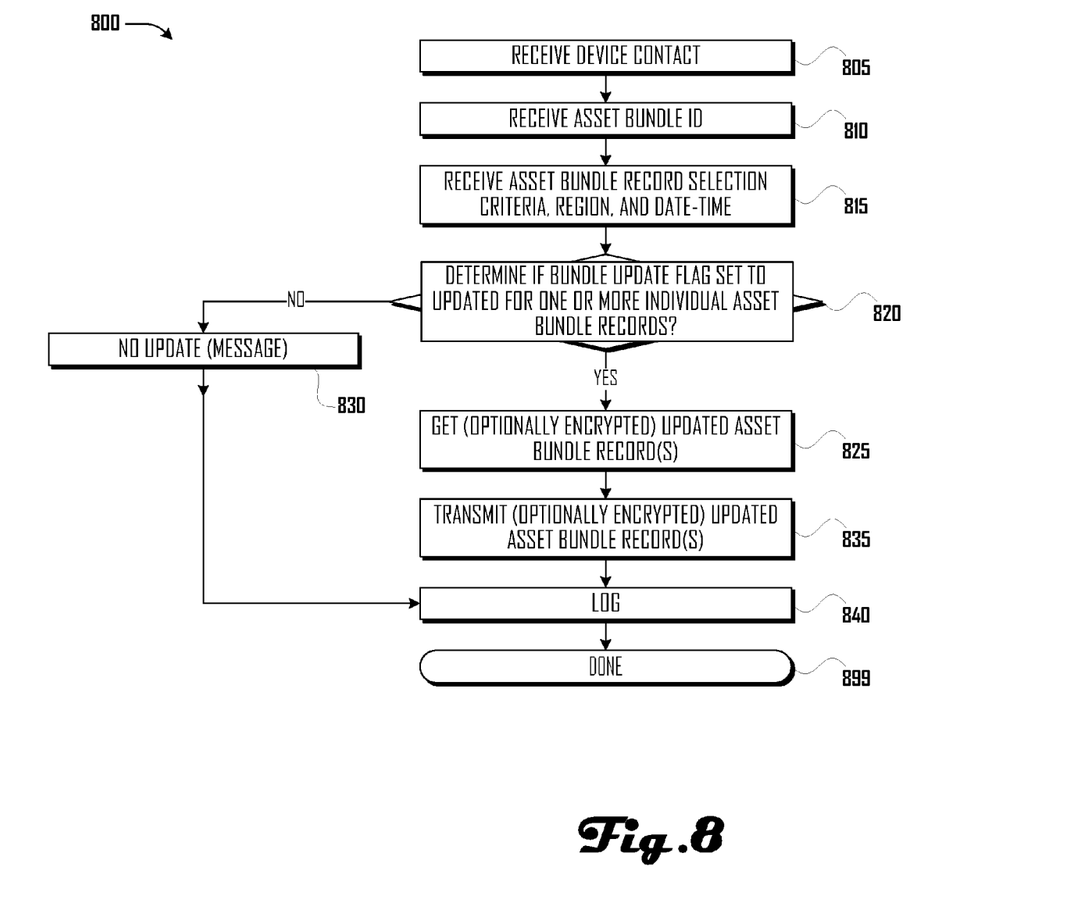
FIG. 8 is a flowchart illustrating an embodiment of an OTA Update Routine 800.

The Localize Server 200 may execute an Asset Bundle Update Routine 700 to allow Mobile Phone Service Operators to update Asset Bundle records after the Asset Bundle Package 346 has been transmitted to the OEM 120. The Localize Server 200 may execute an OTA Update Routine 800 to update Asset Bundle records on the Mobile Device 400 after such records have been updated by the Asset Bundle Update Routine 700.

Figure 9A:
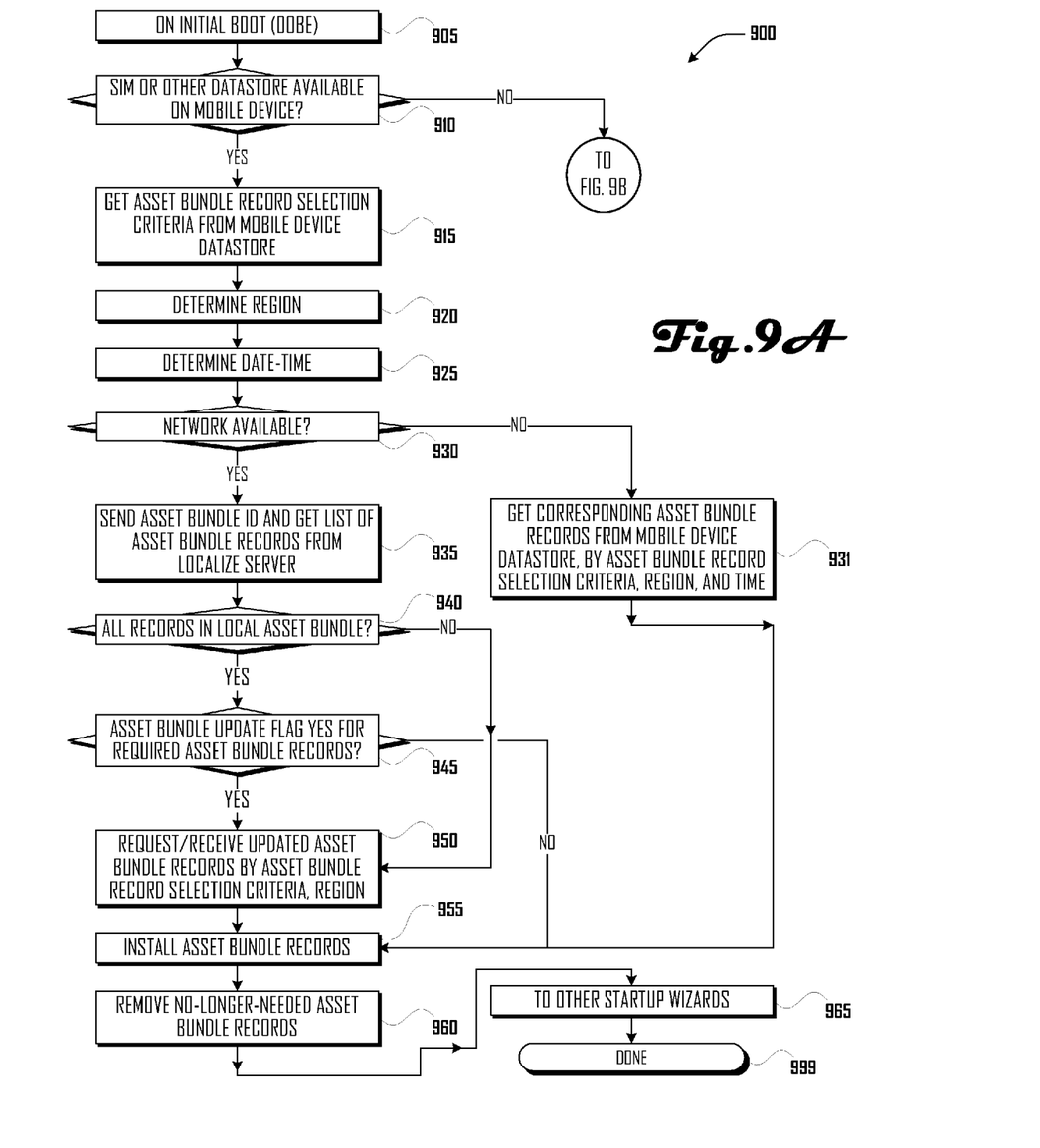
FIGS. 9A and 9B are a flowchart illustrating an embodiment of a Localize Boot Routine 900.
Figure 9B:
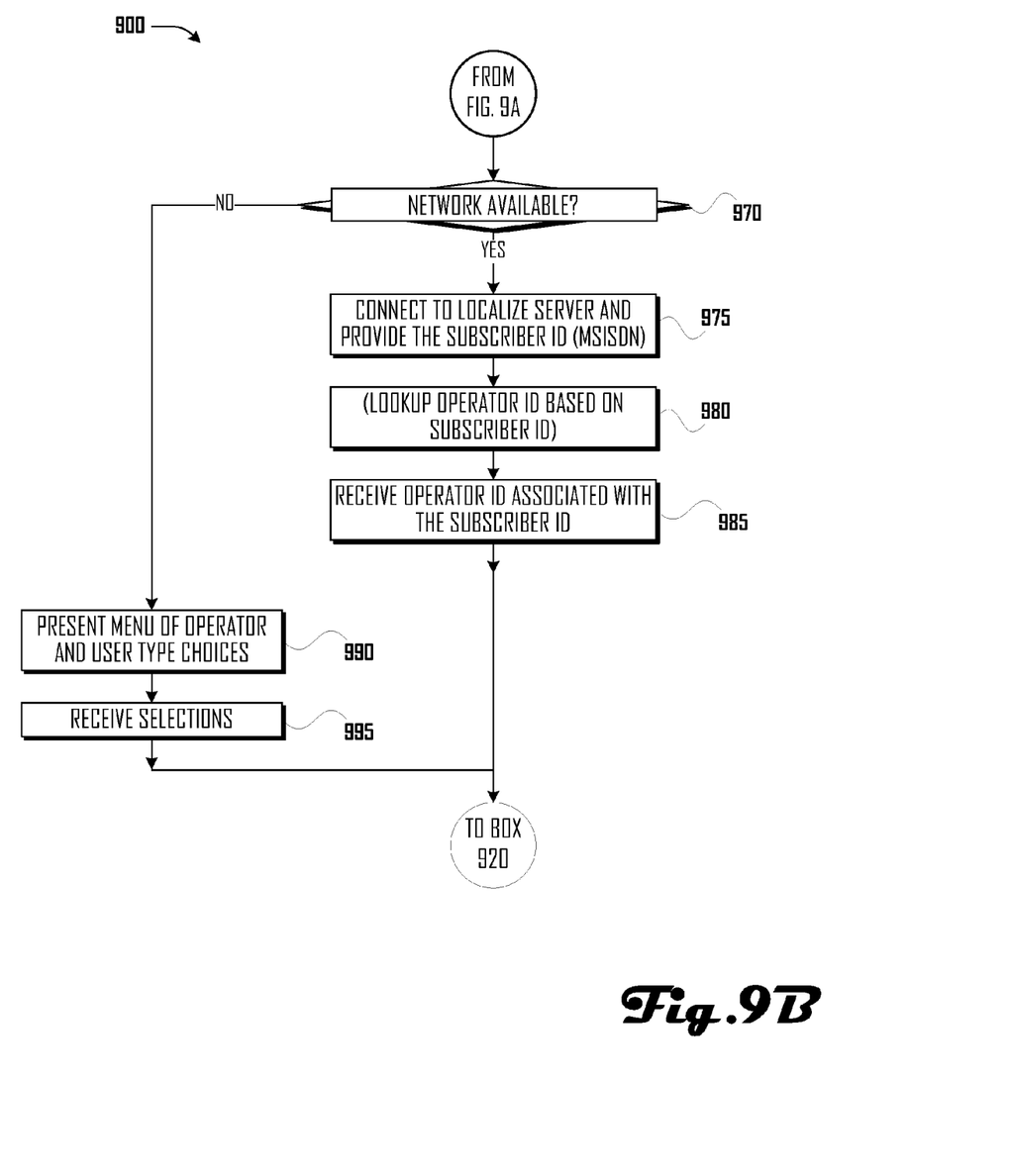

The Mobile Device 400 may execute the Localize Boot Routine 900 to utilize the Asset Bundle Package 346 to configure the Mobile Device 400. As described further in FIG. 9, the Localize Boot Routine 900 selects the appropriate Asset Bundle records from the Asset Bundle Package 346 according to the Asset Bundle Record Selection Criteria. The Localize Boot Routine 900 may also contact the OTA Update Routine 800 to obtain updates to the selected Asset Bundle records, if necessary.

Figure 10:
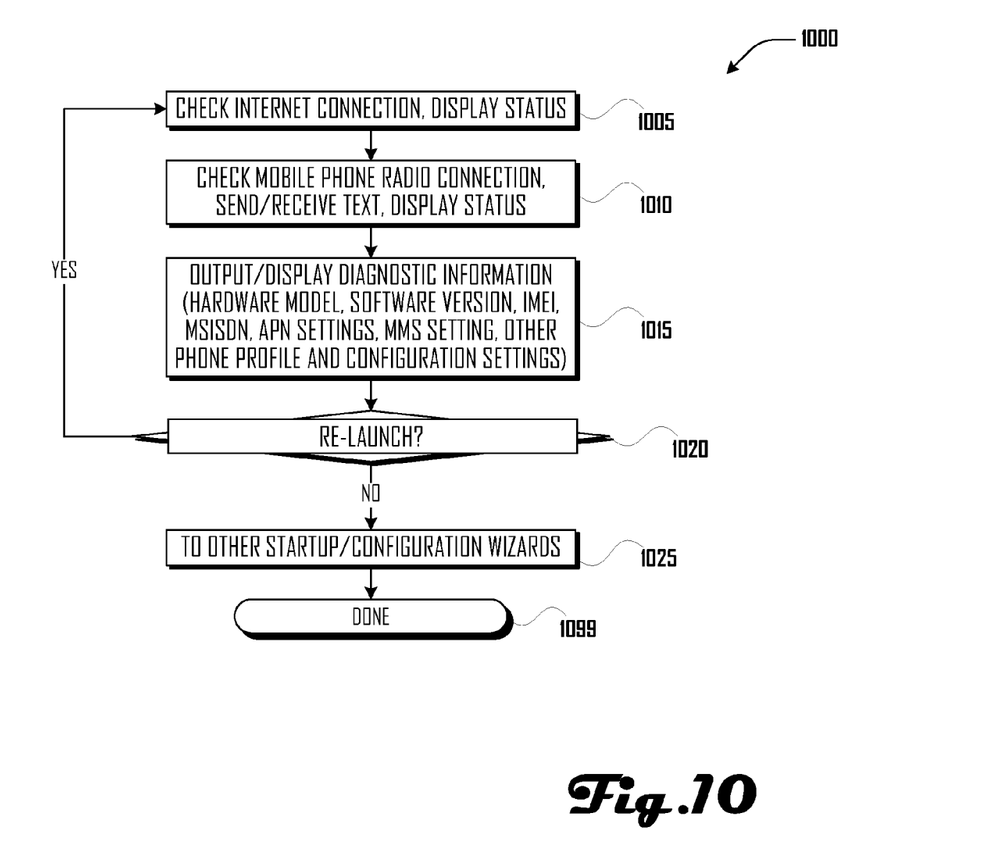
FIG. 10 is a flowchart illustrating an embodiment of an Alive Routine 1000.

The Mobile Device 400 may also execute the Alive Routine 1000, which may be used at the time of initialization of the Mobile Device 400 to check the Mobile Device's 400 voice and data network connections, prior to completion of wizards used to configure the Mobile Device 400.

Figure 1:
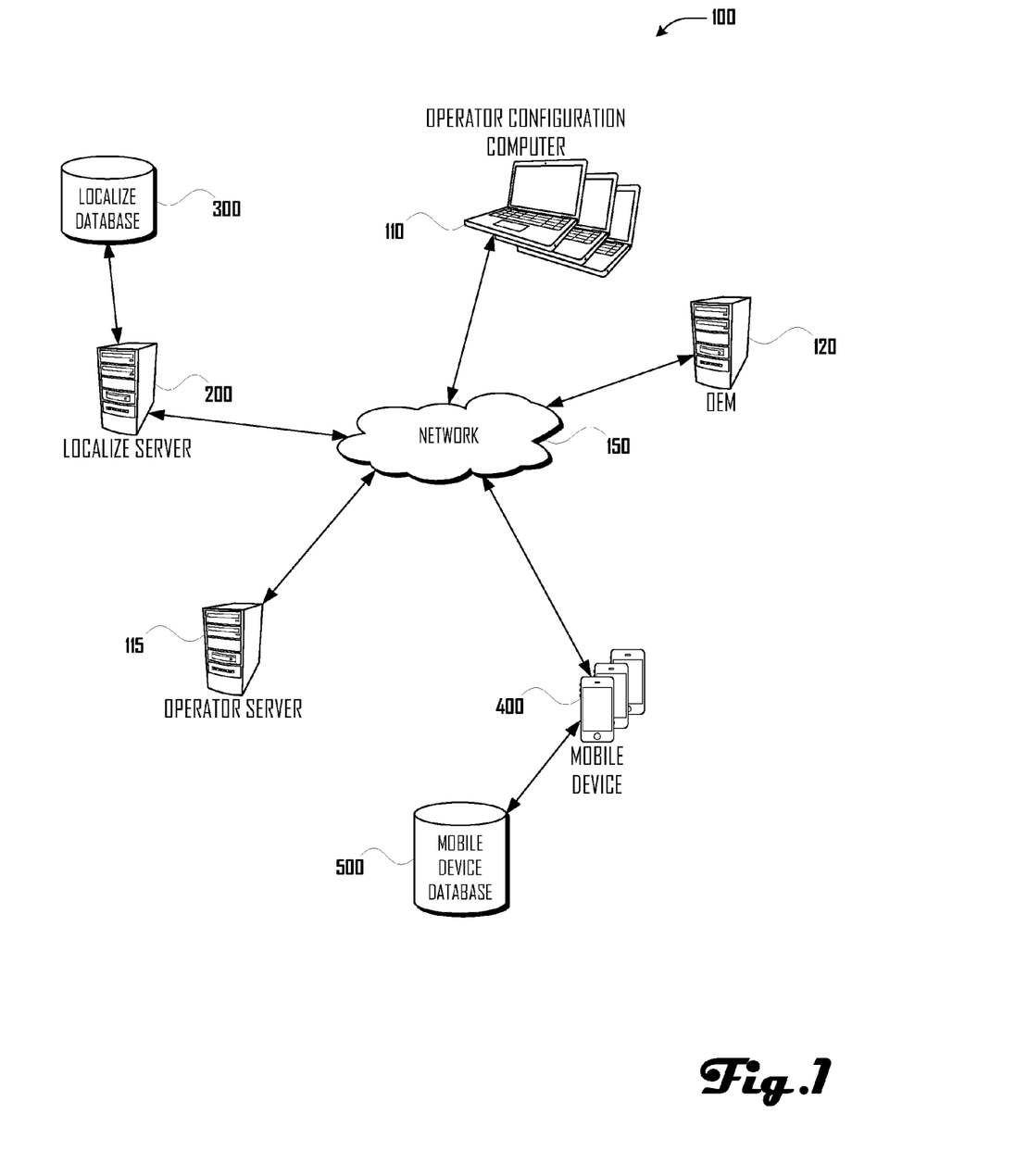
FIG. 1 is a network and device diagram illustrating exemplary computing devices configured according to embodiments disclosed in this paper.

FIG. 1 is a network and device diagram illustrating exemplary computing devices configured according to embodiments disclosed in this paper. Illustrated in FIG. 1 are a Localize Server 200 and a Localize Database 300. The Localize Database 300 is discussed further in relation to FIG. 3.

Also illustrated in FIG. 1 is a Mobile Device 400, representing Mobile Device 1 to N, and a Mobile Device Database 300. By way of example, the Mobile Device Database 300 may be in internal or in removable storage in the Mobile Device 400. Using the Android® operating system as an example, the operating system provides Shared Preferences, Internal Storage, External Storage, SQLite Databases, and a Network Connection for storing data. The Shared Preferences method saves/retrieves persistent key-value pairs of primitive data types, typically in a datastore local to the Mobile Device 400. The Internal Storage method stores data internally (or locally) to the Mobile Device 400; the Internal Storage is typically not removable, though it may be provided through a partition in a removable media, such as a partition in an SD card. The Internal Storage method provided by the Android® operating system saves files privately, specific to different applications. The Internal Storage routine is invoked by calling the <openFileOutput( )> subroutine in the Android® operating system. The External Storage method typically utilizes removable storage media, such as a SIM card or SD card, though it can also use an internal (non-removable) data store. The External Storage method generally allows read/write permissions for all applications (unlike Internal Storage). The SQLite Database methods allow routines to make database calls on data, typically stored locally to the Mobile Device 400. In the context of the Android® operating system, Content Providers allow data to be shared (potentially securely shared) between different software applications and the CryptKeeper method allows data to be securely down- or uploaded to a Mobile Device.

The Mobile Device 400 may be located at, for example, a retail location, a retail location for Mobile Devices 400, a home, apartment, work site, or any other location where the Mobile Device 400 may be booted for the first time or booted from a "factory reset" or similar unconfigured state.

FIG. 1 also illustrates Operator Configuration Computer 110 (representing Operator Configuration Computer 1 to N), Operator Server 115 (representing Operator Server 1 to N), and OEM 120 (representing OEM 1 to N). The Mobile Device 400 may be a mobile or non-mobile computer device, such as, for example, a mobile phone, a tablet, laptop, personal computer, gaming computer, media playback computer, or other computer. The Mobile Device 400 represents any computing device capable of executing the Localize Boot Routine 900 or the Alive Routine 1000. Mobile Devices 400 are used by "Users." The Mobile Device 400 and the Localize Boot Routine 900 may interact with the OTA Update Routine 800. The Operator Configuration Computer 110 and the OEM 120 may interact with the Operator Server 115 and the Operator Configuration Routine 600 and the Asset Bundle Update Routine 700.

In FIG. 1, the computing machines may be physically separate computing devices or logically separate processes executed by a common computing device. Certain components are illustrated in FIG. 1 as connecting directly to one another (such as, for example, the Localize Database 300 to the Localize Server 200), though the connections may be through the Network 150. If these components are embodied in separate computers, then additional steps may be added to the disclosed invention to recite communicating between the components.

The Network 150 comprises computers, network connections among the computers, and software routines to enable communication between the computers over the network connections. Examples of the Network 150 comprise an Ethernet network, the Internet, and/or a cellular network, such as a GSM, TDMA, CDMA, EDGE, HSPA, LTE or other network provided by a Mobile Phone Service Operator, which Mobile Phone Service Operator may be identified by an Operator ID 305. Connection to the Network 150 may also be via a Wi-Fi connection. More than one network may be involved in a communication session between the illustrated devices. Connection to the Network 150 may require that the computers execute software routines which enable, for example, the seven layers of the OSI model of computer networking or equivalent in a wireless phone network.

This paper may discuss a first computer as connecting to a second computer (such as a Mobile Device 400 connecting to the Localize Server 200) or to a corresponding datastore (such as to Localize Database 300); it should be understood that such connections may be to, through, or via the other of the two components (for example, a statement that a computing device connects with or sends data to the Localize Server 200 should be understood as saying that the computing device may connect with or send data to the Localize Database 300). References herein to "database" should be understood as equivalent to "datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

Figure 2:
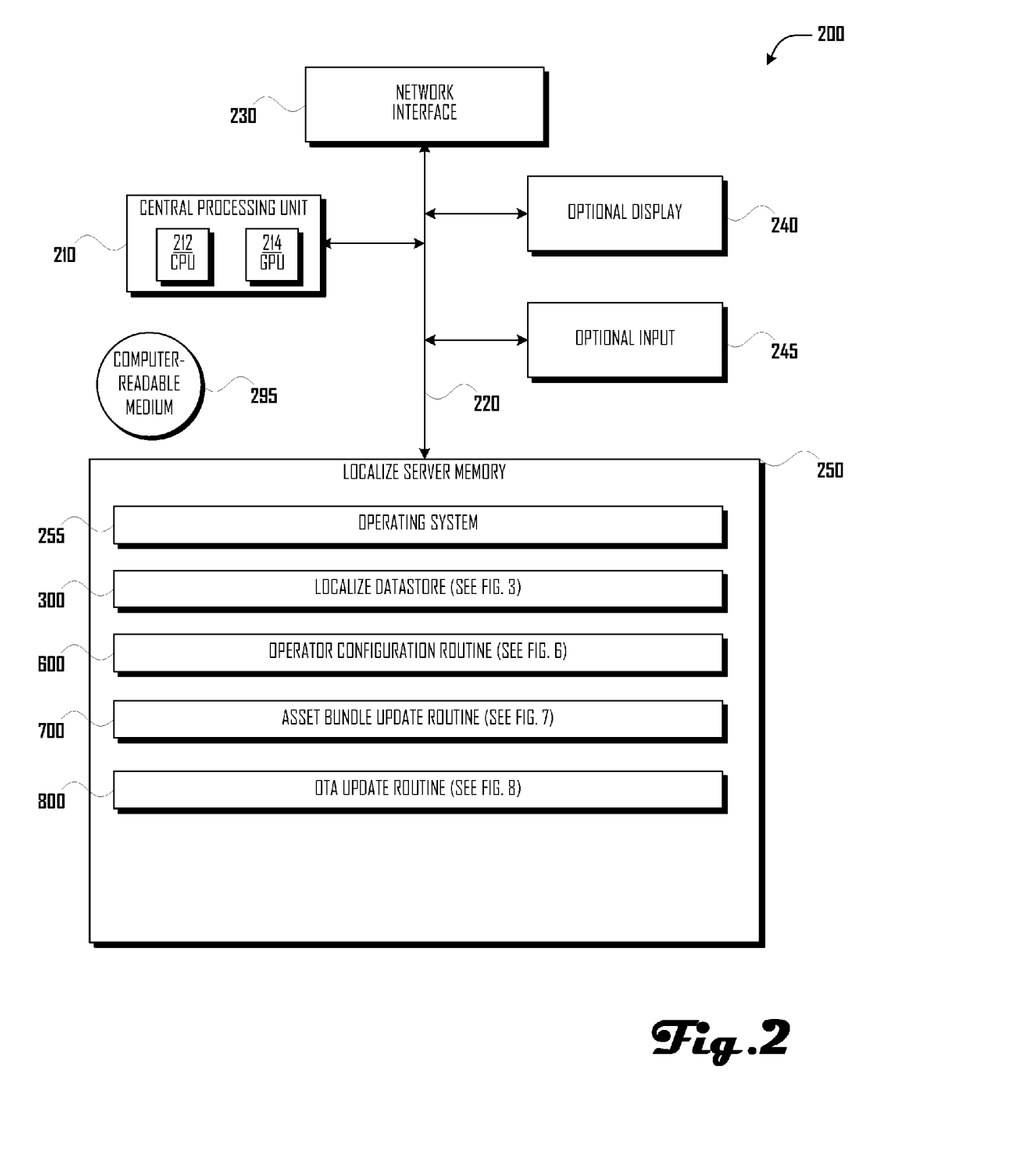
FIG. 2 is a functional block diagram of an exemplary Localize Server 200 computing device and some data structures and/or components thereof.

FIG. 2 is a functional block diagram of an exemplary Localize Server 200 computing device and some data structures and/or components thereof. The Localize Server 200 in FIG. 2 comprises at least one Processing Unit 210, Localize Server Memory 250, a Display 240 and Input 245, all interconnected along with the Network Interface 230 via a Bus 220. The Processing Unit 210 may comprise one or more general-purpose Central Processing Units ("CPU") 212 as well as one or more special-purpose Graphics Processing Units ("GPU") 214. The components of the Processing Unit 210 may be utilized by the Operating System 255 for different functions required by the routines executed by the Localize Server 200. The Network Interface 230 may be utilized to form connections with the Network 150 or to form device-to-device connections with other computers. The Localize Server Memory 250 generally comprises a random access memory ("RAM"), a read only memory ("ROM"), and a permanent mass storage device, such as a disk drive, SDRAM (synchronous dynamic random-access memory), or other internal memory.

The Localize Server Memory 250 stores program code for software routines, such as, for example, Operator Configuration Routine 600, Asset Bundle Update Routine 700, and OTA Update Routine 800 as well as, for example, browser, email client and server routines, client applications, and database applications (discussed further below). Additional data groups for routines, such as for a webserver and web browser, may also be present on and executed by the Localize Server 200 and the other computers illustrated in FIG. 1. Webserver and browser routines may provide an interface for interaction among the computing devices, for example, through webserver and web browser routines which may serve and respond to data and information in the form of webpages and html documents or files. The browsers and webservers are meant to illustrate machine- and user-interface and user-interface enabling routines generally, and may be replaced by equivalent routines for serving and rendering information to and in interfaces in a computing device (whether in a web browser or in, for example, a mobile device application).

In addition, the Localize Server Memory 250 also stores an Operating System 255. These software components may be loaded from a non-transient Computer Readable Storage Medium 295 into Localize Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supporting input modalities, Input 245, such as, for example, a touchscreen, a camera, a keyboard, a mouse, a trackball, a stylus, motion detectors, and a microphone. The Input 245 may also serve as a Display 240, as in the case of a touchscreen display which also serves as Input 245, and which may respond to input in the form of contact by a finger or stylus with the surface of the Input 245.

Figure 3:
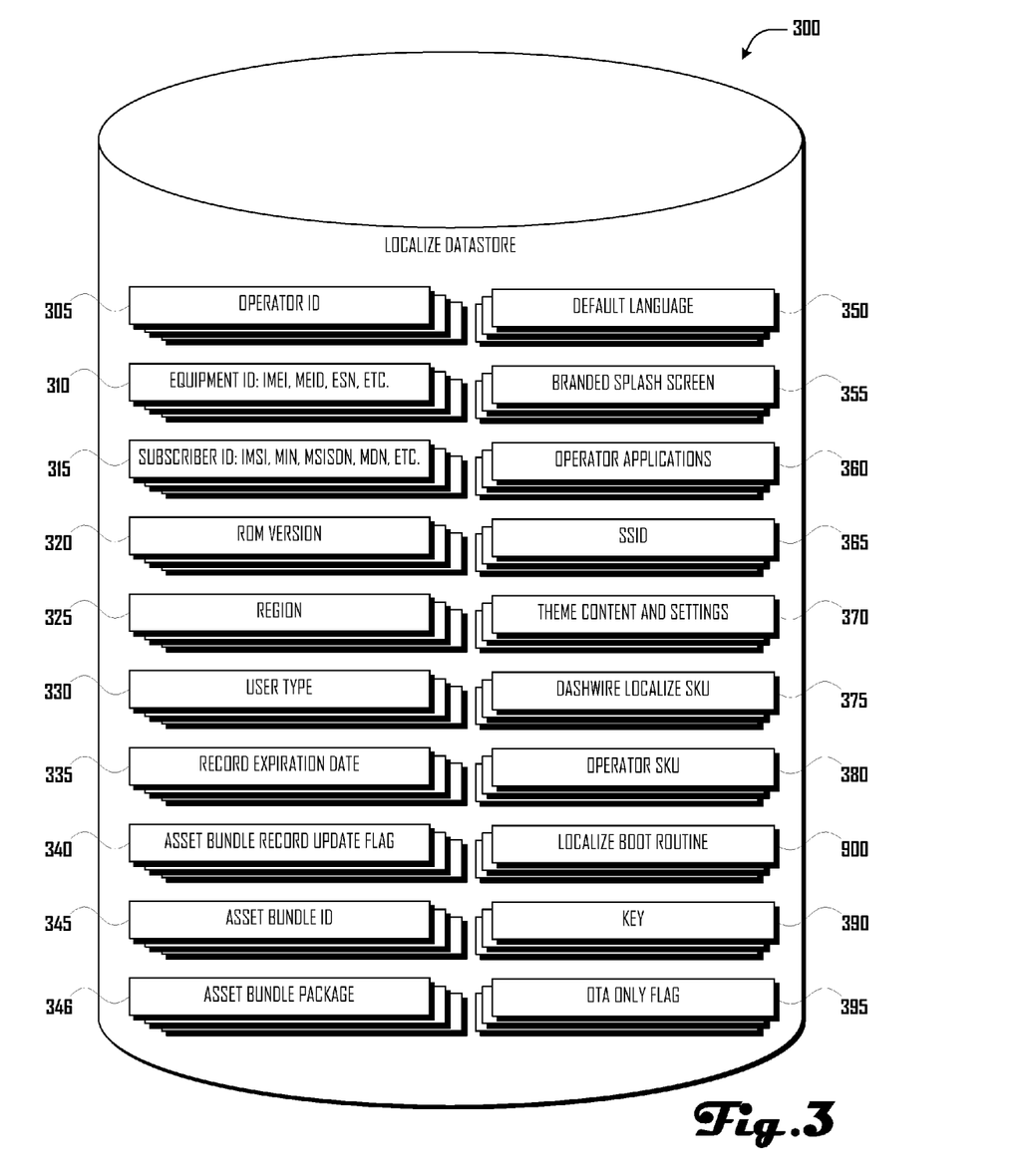
FIG. 3 is a functional block diagram of the Localize Datastore 300 illustrated in the computing device of FIG. 2.

The computing device 200 may also comprise or communicate via Bus 220 with Localize Datastore 300, illustrated further in FIG. 3. In various embodiments, Bus 220 may comprise a storage area network ("SAN"), a high speed serial bus, and/or via other suitable communication technology. In some embodiments, the Localize Server 200 may communicate with the Localize Datastore 300 via Network Interface 230. The Localize Server 200 may, in some embodiments, include many more components than those shown in this Figure. However, it is not necessary that all conventional components be shown in order to disclose an illustrative embodiment.

FIG. 3 is a functional block diagram of the Localize Datastore 300 illustrated in the computing device of FIG. 2. The components of the Localize Datastore 300 are data groups used by routines and are discussed further herein in the discussion of other of the Figures. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
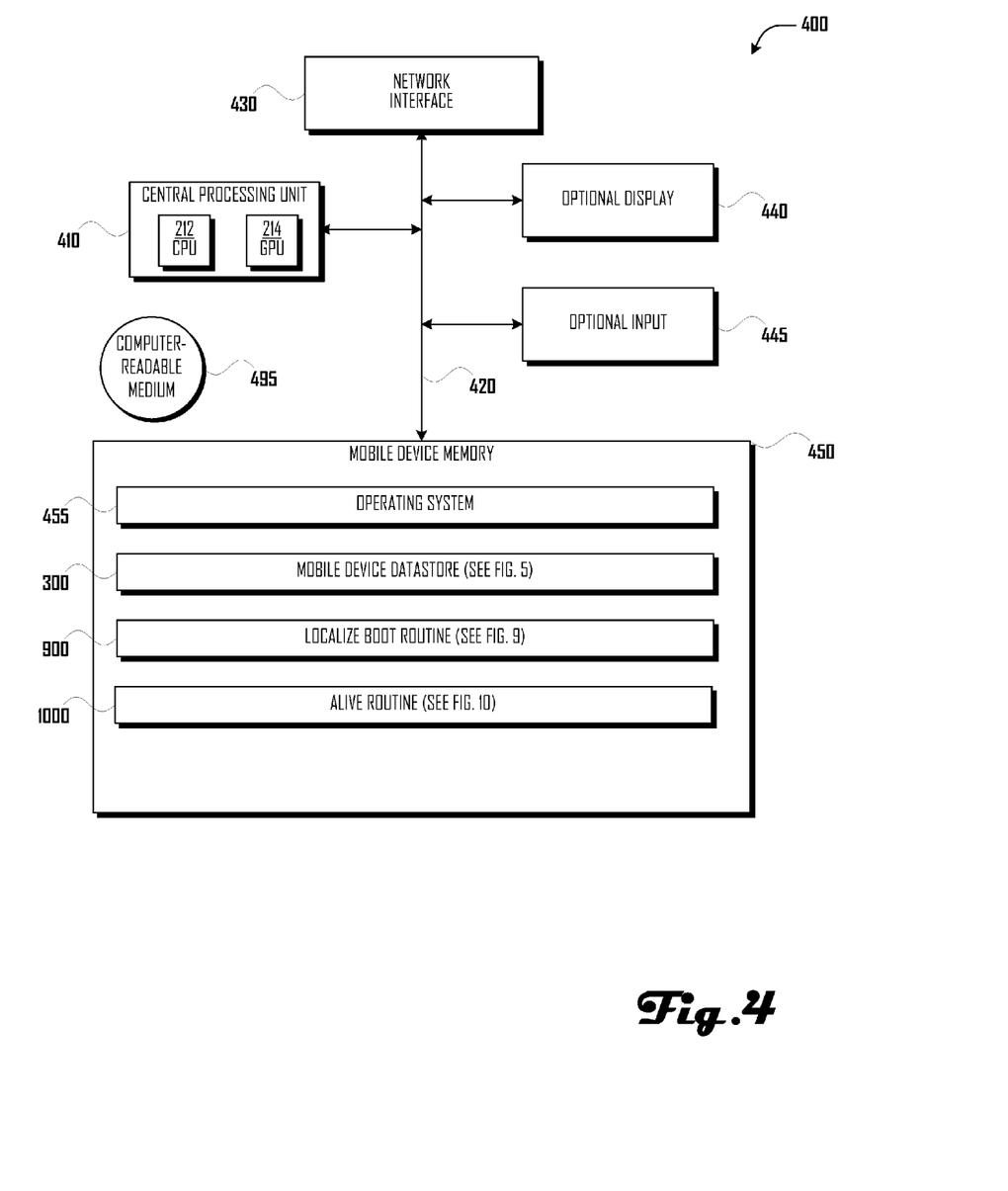
FIG. 4 is a functional block diagram of an exemplary Mobile Device 400 computing device and some data structures and/or components thereof.

FIG. 4 is a functional block diagram of an exemplary Mobile Device 400 computing device and some data structures and/or components thereof. The Mobile Device 400 comprises at least one Processing Unit 410, Mobile Device Memory 450, a Display 440 and Input 445, all interconnected along with the Network Interface 430 via a Bus 420. The Processing Unit 410 may comprise one or more general-purpose Central Processing Units ("CPU") 412 as well as one or more special-purpose Graphics Processing Units ("GPU")

414. The components of the Processing Unit 410 may be utilized by the Operating System 455 for different functions required by the routines executed by the Mobile Device 400. The Network Interface 430 may be utilized to form connections with the Network 150 or to form device-to-device connections with other computers. The Mobile Device Memory 450 generally comprises a random access memory ("RAM"), a read only memory ("ROM"), and a permanent mass storage device, such as a disk drive, SDRAM (synchronous dynamic random-access memory), other internal memory, or physically removable memory, such as SIM card, SD card, or other removable memory.

The Mobile Device Memory 450 stores program code for software routines, such as, for example, Localize Boot Routine 900 and the Alive Routine 1000 as well as, for example, browser, email client and server routines, client applications, and database applications (discussed further below). Additional data groups for routines, such as for a webserver and web browser, may also be present on and executed by the Mobile Device 400 and the other computers illustrated in FIG. 1. Webserver and browser routines may provide an interface for interaction among the computing devices, for example, through webserver and web browser routines which may serve and respond to data and information in the form of webpages and html documents or files. The browsers and webservers are meant to illustrate machine- and user-interface and user-interface enabling routines generally, and may be replaced by equivalent routines for serving and rendering information to and in interfaces in a computing device (whether in a web browser or in, for example, a mobile device application).

In addition, the Mobile Device Memory 450 also stores an Operating System 455. These software components may be loaded from a non-transient Computer Readable Storage Medium 495 into Mobile Device Memory 450 of the computing device using a drive mechanism (not shown) associated with a non-transient Computer Readable Storage Medium 495, such as a floppy disc, tape, DVD/CD-ROM drive, memory card, SIM card, SD card, or other like storage medium. In some embodiments, software components may also or instead be loaded via a mechanism other than a drive mechanism and Computer Readable Storage Medium 495 (e.g., via Network Interface 430).

The computing device 400 may also comprise hardware supporting input modalities, Input 445, such as, for example, a touchscreen, a camera, a keyboard, a mouse, a trackball, a stylus, motion detectors, compass(es), GPS antenna(ea), and a microphone. The Input 445 may also serve as a Display 440, as in the case of a touchscreen display which also serves as Input 445, and which may respond to input in the form of contact by a finger or stylus with the surface of the Input 445, in the form of voice input, and the like.

Figure 5:
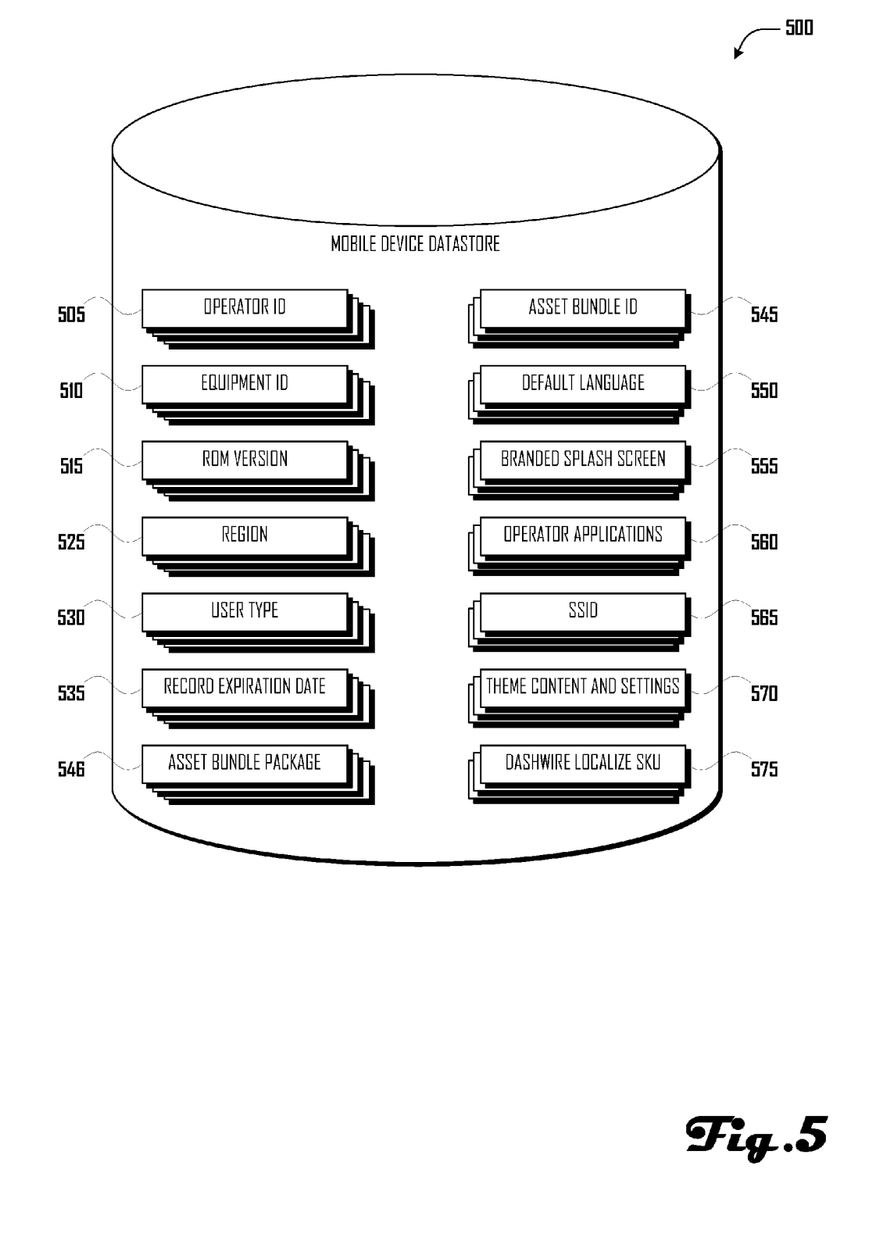
FIG. 5 is a functional block diagram of the Mobile Device Datastore 500 illustrated in the computing device of FIG. 4.

The computing device 400 may also comprise or communicate via Bus 420 with Mobile Device Datastore 500, illustrated further in FIG. 5. In various embodiments, Bus 420 may comprise a storage area network ("SAN"), a high speed serial bus, and/or via other suitable communication technology. In some embodiments, the Mobile Device 400 may communicate with the Mobile Device Datastore 500 via Network Interface 430. The Mobile Device 400 may, in some embodiments, include many more components than those shown in this Figure. However, it is not necessary that all conventional components be shown in order to disclose an illustrative embodiment.

FIG. 5 is a functional block diagram of the Mobile Device Datastore 500 illustrated in the computing device of FIG. 4. The components of the Mobile Device Datastore 500 are data groups used by routines and are discussed further herein in the discussion of other of the Figures. The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 6:
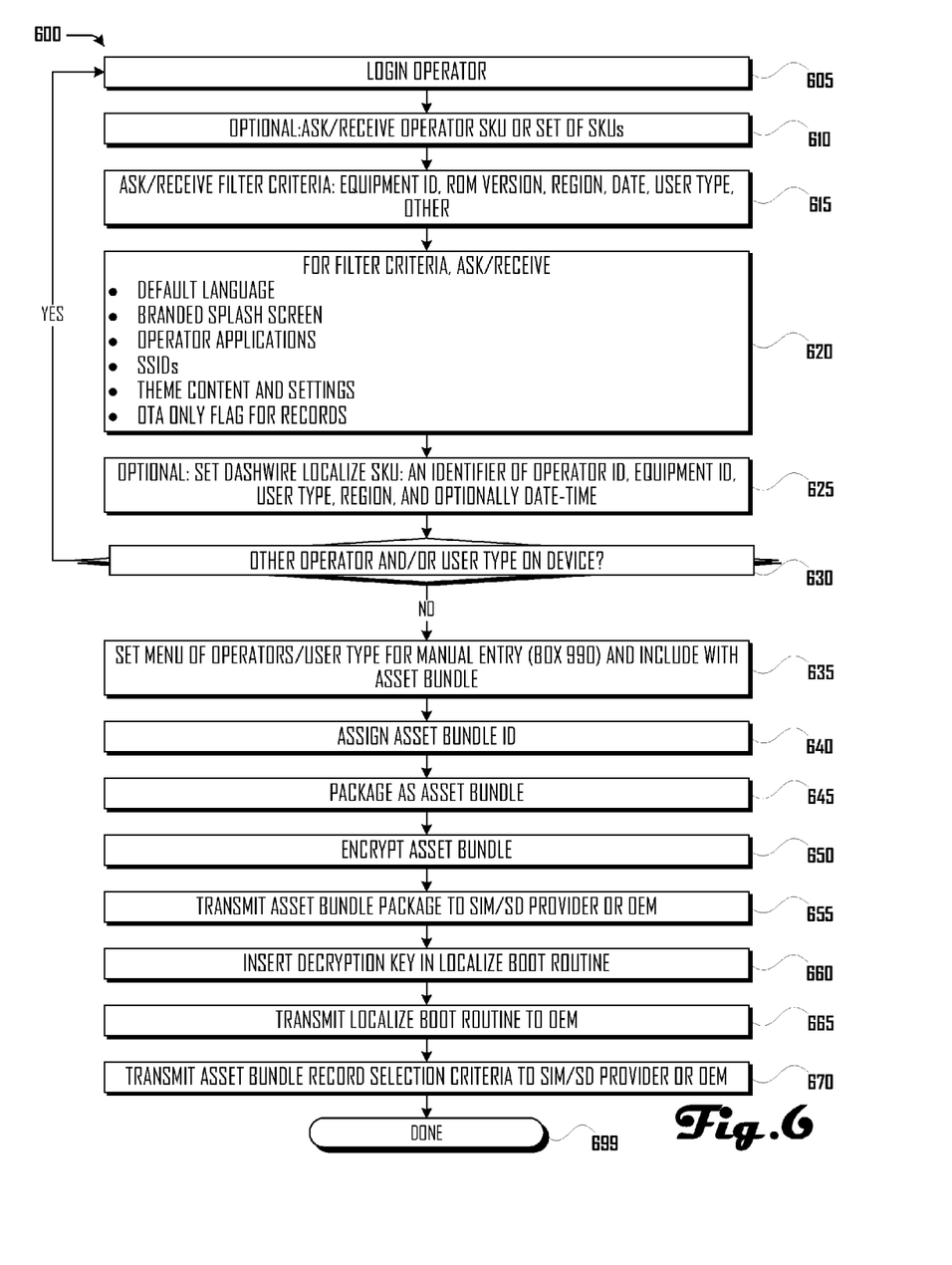
FIG. 6 is a flowchart illustrating an embodiment of an Operator Configuration Routine 600.

FIG. 6 is a flowchart illustrating an embodiment of an Operator Configuration Routine 600.

The Operator Configuration Routine 600 may be performed by, for example, the Localize Server 200 or by the OEM 120 or by the Localize Server 200 on behalf of the EOM 120. At box 605, the Operator Configuration Routine 600 is contacted by a Mobile Phone Service Operator and logs the Mobile Phone Service Operator into the Operator Configuration Routine 600, such as by presenting authentication and authorization credentials. The logged-in Mobile Phone Service Operator may be identified by, for example, the Operator ID 305. The Mobile Phone Service Operator may be using, for example, the Operator Configuration Computer 110.

At box 610, the Operator Configuration Routine 600 may optionally request and receive an Operator SKU or set of Operator SKUs, which the Operator Configuration Routine 600 may store as Operator SKU 380 records. The Operator SKU may be an identifier used by a Mobile Phone Service Operator, potentially obtained from or developed in conjunction with an OEM 120, to identify a configuration for a Mobile Phone 400.

At box 615, the Operator Configuration Routine 600 may request and receive filter criteria, such as, for example, an Equipment ID for a Mobile Device 400, a ROM version for the Mobile Device 400, a region, an expiration date for a configuration, a User Type, and the like. The Operator Configuration Routine 600 may store the received criteria as Equipment ID 310, ROM Version 320, Region 325, User Type 330, and Record Expiration Date 335. The Equipment ID 310 may be, for example an IMEI, MEID, ESN, or the like.

At box 620, the Operator Configuration Routine 600 may request and receive, with respect to the filter criteria of box 615, a Default Language, a Branded Splash Screen, Operator Applications, SSIDs, Theme Content and Settings, and whether a flag should be set to provide the record only in an Over the Air ("OTA") update. The Operator Configuration Routine 600 may store the received responses as Default Language 350, Branded Splash Screen 355, Operator Applications 360, SSID 365, Theme Content and Settings 370, and OTA Only Flag 395. The Default Language may be the default language which is to be used for the Mobile Device 400. The Branded Splash Screen may comprise graphics, text, and similar which are rendered by the Mobile Device 400 periodically, such as on startup, and which identify the Mobile Phone Service Operator. The Branded Splash Screen may replace a default splash screen which would otherwise be included in the Mobile Device 400 by the OEM 120. The Operator Applications may comprise software applications which are to be loaded on the Mobile Device 400 such as, for example, a Self-Care Application specific to the Mobile Phone Service Operator and other software applications which the Mobile Phone Service Operator requires be loaded on the Mobile Device 400. The SSIDs may comprise a set of Wi-Fi SSIDs and potentially passwords therefore. The Theme Content and Settings may comprise, for example, ringtones, email signatures (such as "Sent from my YYY Skyrocket on XXX nationwide network") which may replace a default email signature, APN setup (to set up the Mobile Device's 400 APN if necessary to ensure a stable data connection), SMS preset messages, Mobile Phone Service Operator provided webpage bookmarks (such as to a customer service page), preset power management features; voicemail number settings, a custom launcher and a user interface and fonts therefor (which may replace a default launcher which would otherwise be provided by the OEM 120), and SIM lock settings (to lock the Mobile Phone 400 to a specific Mobile Phone Service Operator).

At box 625, the Operator Configuration Routine 600 may determine a Dashwire Localize SKU, which may be stored as Dashwire Localize SKU 375. The Dashwire Localize SKU may be associated with an Operator ID 305 associated with the Mobile Phone Service Operator of box 605, the Equipment ID 310, the User Type 330, the Region 325, and optionally a Date-Time, and/or other of the filter criteria of box 615.

At box 630, the Operator Configuration Routine 600 may determine whether other Mobile Phone Service Operators are going to be including records in the Asset Bundle Package 346 for the Mobile Phone 400 and/or whether the Mobile Phone Service Operator of box 605 is going to include other records in the Asset Bundle Package 346 for additional User Types 330. This decision may be left open for a period of time. If there are, then the Operator Configuration Routine 600 may return to box 605 to login the next Mobile Phone Service Operator; if there are not, then the Operator Configuration Routine 600 may proceed to box 635.

At box 635, the Operator Configuration Routine 600 may set values in a menu with the Mobile Phone Service Operators of box 605 (there may be more than one Mobile Phone Service Operator in the iterations of box 605) and the User Types 330 (of box 615) associated with each Mobile Phone Service Operator. These values may be used in a menu presented to the User at box 990, if a SIM or other local datastore and a network connection are not available. The menu and values are included with the Asset Bundle records.

At box 640, the Operator Configuration Routine 600 may assign an Asset Bundle ID 345 to the collection of records and, at box 645, may package the records as an Asset Bundle Package 346. Packaging the records may comprise placing them in a file with a filestructure and/or with a manifest record, such as an XML file, which identifies the contents of the Asset Bundle Package 346. The Asset Bundle Package 346 may be compressed.

At box 650, the Operator Configuration Routine 600 may encrypt the Asset Bundle Package 346 such that unauthorized processes cannot access the contents of the Asset Bundle Package 346. Encryption may use, for example, a symmetric-key or a public-key encryption scheme. Generally, in a symmetric-key approach, the encryption and decryption keys are the same. In a public-key approach, the encryption key is publicly available, but the decryption key is not; only a process or routine with the decryption key will be able to decrypt the encrypted file. The encryption key (or keys) may be stored as Key 390.

At box 655, the encrypted Asset Bundle Package 346 is transmitted to a party providing SIM and/or SD cards to the OEM 120 and/or to the OEM 120. At box 660, the decryption key (or a link thereto) is inserted into the Localize Boot Routine 900 which may comprise an initialization script, or initialization process, or into a process such as the Android® cryptkeeper method.

At box 665, the Localize Boot Routine 900 comprising the decryption key is transmitted to the OEM 120.

At box 670, Asset Bundle Record Selection Criteria 346 is transmitted to the OEM 120 and/or to a party providing SIM and/or SD cards to the OEM 120. The Asset Bundle Record Selection Criteria allow the Localize Boot Routine 900 to select the correct set of records from the Asset Bundle 346 to configure the Mobile Device 400 for a particular User who has purchased Mobile Phone service from a Mobile Phone Service Operator. The Asset Bundle Record Selection Criteria comprise, for example, the Operator ID 305 and the User Type 330. See box 915.

The OEM 120 may be instructed to load the Localize Boot Routine 900 into Internal Memory on the Mobile Device 400. The OEM 120 and/or a provider of SIM and/or SD cards may be instructed to load the Asset Bundle Record Selection Criteria and the Asset Bundle Package into External Memory, such as onto a SIM or SD card which is inserted or otherwise incorporated into the Mobile Device. The Asset Bundle Package on the Mobile Device 400 is noted by Asset Bundle Package 546.

FIG. 7 is a flowchart illustrating an embodiment of an Operator Asset Bundle Update Routine 700. This routine may allow a Mobile Phone Service Operator to update Asset Bundle records. At box 705, the Operator Asset Bundle Update Routine 700 may login a Mobile Phone Service Operator, such as using credentials, and may identify the Mobile Phone Service Operator by, for example, the Operator ID 305. The Mobile Phone Service Operator may be using, for example, the Operator Configuration Computer 110.

At box 710, the Operator Asset Bundle Update Routine 700 may request and receive from the Mobile Phone Service Operator a set of filter criteria, such as, for example, an Asset Bundle ID 345, a User Type 330, a Region 325, a date-time range (which may be relative to a Record Expiration Date 335), an Equipment ID 310, and the like. The filter criteria may be used to search for Asset Bundle records which correspond to the filter criteria.

At box 715, the Operator Asset Bundle Update Routine 700 may search the Asset Bundle records according to the filter criteria of box 710 and may show the Mobile Phone Service Operator the Asset Bundle Packages which correspond to the filter criteria and which are associated with the Operator ID 305.

At box 720, the Operator Asset Bundle Update Routine 700 may receive from the Mobile Phone Service Operator a selection of one of the Asset Bundle Packages 346. At box 725, the Operator Asset Bundle Update Routine 700 may show the Mobile Phone Service Operator the records in the Asset Bundle Package 346 which correspond to the Operator ID 305 of the Mobile Phone Service Operator.

At box 730, the Operator Asset Bundle Update Routine 700 may receive an update to one or more of the Asset Bundle Package 346 records from the Mobile Phone Service Operator.

At box 735, the Operator Asset Bundle Update Routine 700 may, if necessary, obtain the Key 390 used to encrypt the Asset Bundle Package 346. At box 740, the Operator Asset Bundle Update Routine 700 may encrypt the updated Asset Bundle record(s) of box 730 using the Key 390 and may store the updated Asset Bundle records.

Alternative to and/or in addition to encrypting the updated Asset Bundle record(s) of box 730, the updated Asset Bundle record(s) of box 730 may be transmitted to the Mobile Device 400 using secure means, such as an SSL connection over HTTPS.

At box 745, the Operator Asset Bundle Update Routine 700 may set the Asset Bundle Record Update Flag 340 to "updated" (or equivalent) to record that the Asset Bundle records of box 730 have been updated (which record may be used at box 945).

At box 750, the Operator Asset Bundle Update Routine 700 may request, receive, and set a Record Expiration Date 335 for the updated Asset Bundle records of box 730.

At box 799, the Operator Asset Bundle Update Routine 700 may conclude.

FIG. 8 is a flowchart illustrating an embodiment of an OTA Update Routine 800. This routine may allow the Localize Server 200 to update Asset Bundle records at a Mobile Device 400 which is being configured.

At box 805, the OTA Update Routine 800 receives a contact from a Mobile Device 400. The contact may be generated by, for example, the Localize Boot Routine 900 executed by the Mobile Device 400.

At box 810, the OTA Update Routine 800 may receive from the Localize Boot Routine 900 the Asset Bundle ID 345 for the Asset Bundle on the Mobile Device 400.

At box 815, the OTA Update Routine 800 may receive the Asset Bundle Record Selection Criteria. The OTA Update Routine 800 may also receive from the Localize Boot Routine 900 or the OTA Update Routine 800 may determine the Region 325 of the Mobile Device 400 (such as according to an location of the Mobile Device 400 obtained from GPS in the Mobile Device 400 or another source). The OTA Update Routine 800 may also determine or receive the then-current date-time in the location of the Mobile Device 400.

At box 820, the information received in box 815 may be used to lookup the records in the Asset Bundle Package 346 which are to be used to configure the Mobile Device 400 (not all records in the Asset Bundle Package 346 will be used to configure the Mobile Device 400) and to determine if any of the records have the Asset Bundle Record Update Flag 340 set to "updated" (or equivalent).

If any of the records have the Asset Bundle Record Update Flag 340 set to "updated," then at box 825, the OTA Update Routine 800 may obtain the (optionally encrypted) updated Asset Bundle records (updated by the Operator Asset Bundle Update Routine 700) and may transmit the (optionally encrypted) updated Asset Bundle records to the Mobile Device 400 and the Localize Boot Routine 900. At box 840 the transmission may be logged.

At box 830, which may follow box 820 if none of the records have the Asset Bundle Record Update Flag 340 set to "updated," no update may be noted, which include sending a corresponding message to the Localize Boot Routine 900.

FIGS. 9A and 9B are a flowchart illustrating an embodiment of a Localize Boot Routine 900. This routine may be executed by, for example, the Mobile Device 400.

At box 905, an initial boot or configuration boot of the Mobile Device 400 is being performed. This boot may be performed the first time the Mobile Device 400 is turned on and/or after the Mobile Device 400 has been returned to a "factory default" or "reset" condition.

At box 910, a determination may be made by the Localize Boot Routine 900 regarding whether or not a SIM card or other datastore, such as an External Storage accessible datastore, is available on the Mobile Device 400. If there is such a datastore available, then at box 915, the Localize Boot Routine 900 may obtain the Asset Bundle Record Selection Criteria stored by the OEM 120 in the datastore.

At box 920, the Localize Boot Routine 900 may determine the Region of the Mobile Device 400. The Region may be stored as a Region 525 record in the SIM card or other datastore utilized in box 910 and/or the Region may determined by obtaining the location of the Mobile Device 400, such as from GPS or another location service, and looking up a Region based on the location.

At box 925 the Localize Boot Routine 900 determines the then-current time or date-time.

At box 930 the Localize Boot Routine 900 may determine whether a network is available, such as Network 150. This determination may be with respect to a particular type of network, such as the Internet, such as via a Wi-Fi connection. This determination may first check if an Internet network connection (Wi-Fi) is available and then if a Cellular Network connection is available.

At box 935, the Network 150 was found to be available at box 930 and the Localize Boot Routine 900 sends the Asset Bundle ID 545 to the OTA Update Routine 800 and obtains the current list of Asset Bundle records which should be in the Asset Bundle Package 546 from the OTA Update Routine 800.

At box 940, the Localize Boot Routine 900 compares the obtained list to the Asset Bundle Package 546 and determines if any of the records in the obtained list are missing from the Asset Bundle Package 546. If no records are missing, then at box 945, the Localize Boot Routine 900 may request from the OTA Update Routine 800 whether the Asset Bundle Record Update Flag 340 has been set to "updated" (or equivalent) for the Asset Bundle records.

If yes at box 945, then at box 950 the Localize Boot Routine 900 may request and receive from the OTA Update Routine 800 the updated Asset Bundle records which are required for this configuration for this User. As indicated in box 950, this narrower request may be based on the Asset Bundle Record Selection Criteria, the Region 525 of box 920 and the date-time of box 925.

At box 955, the Asset Bundle records corresponding to the Asset Bundle Record Selection Criteria, the Region 525, and the date-time (which is compared to the Record Expiration Date 535 for the records in the Asset Bundle Package 546) are installed in the Mobile Device 400, configuring the Mobile Device 400 for use. Box 955 may follow box 945 if the conclusion of box 945 was no.

At box 960, the no-longer-needed Asset Bundle records may be removed from the Mobile Device Memory 450, freeing the Mobile Device Memory 450 for use by the User and software applications on the Mobile Device 400. In existing prior art approaches, the OEM typically has to set aside memory in the Mobile Device 400 for configuration files in the system files, which reserved space is not removed or freed after configuration.

At box 965, other startup wizards, if any, may be executed.

At box 931, which may follow box 930 if the determination was no, the Localize Boot Routine 900 may obtain from the Mobile Device Datastore the Asset Bundle records corresponding to the Asset Bundle Record Selection Criteria, the Region 525, and the date-time and may proceed to box 955.

If at box 910, the determination was no, then at box 970 in FIG. 9B the Localize Boot Routine 900 may determine whether a Network 150 is available. This determination may similar to the determination made in box 930, checking first for an Internet connection.

If a Network 150 is available, then the Localize Boot Routine 900 may connect to the Localize Server 200 or an Operator Server 115 and provide the Localize Server 200 or Operator Server 115 with the MSISDN or other Subscriber ID 515. At box 980, the contacted server determines an Operator ID associated with the provided Subscriber ID 515. At box 985, the Localize Boot Routine 900 receives an Operator ID associated with the Subscriber ID 515 and then proceeds to box 920.

At box 990, the determination at box 970 was that no Network 150 was available, and the Localize Boot Routine 900 presents a cascading menu with a first level presenting the Mobile Phone Service Operators from whom the User may be obtaining Mobile Phone Service, with a second level of the menu, which is conditional on the User input received in response to the first level, presenting the User Types pertinent to the Mobile Phone Service Operators selected at the first level. At box 995, the Localize Boot Routine 900 receives the User selections in response to the cascading menu. The Localize Boot Routine 900 then proceeds to box 920.

At box 999, the Localize Boot Routine 900 may conclude.

FIG. 10 is a flowchart illustrating an embodiment of an Alive Routine 1000. The Alive Routine 1000 may be executed by the Mobile Device 400.

At box 1005, the Alive Routine 1000 may check the Internet connection available to the Mobile Device 400, which Internet connection may be a type of connection with the Network 150, and may display the connection status.

At box 1010, the Alive Routine 1000 may check the Mobile Phone radio connection, which may be a type of connection with the Network 150. This connection test may comprise both a voice connection and a text transmission connection attempt. The connection status may be displayed.

At box 1015, the Alive Routine 1000 may output diagnostic information, such as the hardware model (which may be the Equipment ID 510), the software version of the Operating System 455, the IMEI, the MSISDN, the APN settings, the MMS settings, and other phone profile and configuration settings.

At box 1020, a determination may be made by the Alive Routine 1000 regarding whether the Alive Routine 1000 should be re-started. This determination may be based on user input or a user selection.

At box 1025, the Alive Routine 1000 may allow other startup or configuration wizards to execute.

At box 1099, the Alive Routine 1000 may conclude.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A computer implemented method of configuring a mobile computing device, the method comprising:
the mobile computing device comprising in a first memory location a configuration asset bundle package comprising configuration asset bundle records for more than one user type;
when booting the mobile computing device from an unconfigured state, determining whether the first memory location in the mobile computing device contains a mobile phone service operator identifier and a user type identifier;
selecting configuration asset bundle records from the configuration asset bundle package based at least on the mobile phone service operator identifier and user type identifier;
determining that a network connection is available, providing a remote server routine with an identifier of the configuration asset bundle package, receiving from the server routine a list of configuration asset bundle records, and determining if the list of configuration asset bundle records obtained from the server routine correspond to configuration asset bundle records in the configuration asset bundle package;
configuring the mobile computing device for use by the user type utilizing the selected configuration asset bundle records; and
removing the asset bundle package from the memory of the mobile computing device.

2. The method according to claim 1, wherein the configuration asset bundle records in the asset bundle package comprise configuration asset bundle records for more than one mobile phone service provider.

3. The method according to claim 1, further comprising determining that at least one of the selected configuration asset bundle records has been updated, requesting, receiving, and updating the updated selected configuration asset bundle record.

4. The method according to claim 1, further comprising determining a region of the mobile computing device and the then-current date-time and selecting configuration asset bundle records from the configuration asset bundle package based on the mobile phone service operator identifier, user type identifier, region and date-time.

5. The method according to claim 1, wherein the first memory location is at least one of a SIM card and an SD card.

6. The method according to claim 1, wherein the method of claim 1 is stored in a second memory location of the mobile computing device.

7. The method according to claim 6, wherein the second memory location is internal memory in the mobile computing device.

8. A non-transient computer-readable storage medium having stored thereon instructions that, when executed by a processor when booting a mobile computing device from an unconfigured state, the mobile computing device comprising the processor and further comprising a first memory location comprising a configuration asset bundle package comprising configuration asset bundle records for more than one type of user, configure the processor to:
determine whether the first memory location in the mobile computing device contains a mobile phone service operator identifier and a user type identifier;
select configuration asset bundle records from the configuration asset bundle package based at least on the mobile phone service operator identifier and user type identifier;
determine a region of the mobile computing device and the then-current date-time and select configuration asset bundle records from the configuration asset bundle package based on the mobile phone service operator identifier, user type identifier, region and date-time;
configure the mobile computing device for use by the user type utilizing the selected configuration asset bundle records; and
remove the asset bundle package from the memory of the mobile computing device.

9. A computer implemented method of configuring a mobile computing device, the method comprising:

the mobile computing device comprising in a first memory location a configuration asset bundle package comprising configuration asset bundle records for more than one user type;

when booting the mobile computing device from an unconfigured state, determining whether the first memory location in the mobile computing device contains a mobile phone service operator identifier and a user type identifier;

selecting configuration asset bundle records from the configuration asset bundle package based at least on the mobile phone service operator identifier and user type identifier;

determining a region of the mobile computing device and the then-current date-time and selecting configuration asset bundle records from the configuration asset bundle package based on the mobile phone service operator identifier, user type identifier, region and date-time;

configuring the mobile computing device for use by the user type utilizing the selected configuration asset bundle records; and removing the asset bundle package from the memory of the mobile computing device.

* * * * *